United States Patent
Reed, Jr.

(12) 
(10) Patent No.: US 6,421,077 B1
(45) Date of Patent: Jul. 16, 2002

(54) METHOD AND APPARATUS FOR DETECTING CO-CHANNEL INTERFERENCE AND SELECTIVELY FILTERING THE INTERFERENCE WHEN DETECTED

(75) Inventor: Charles Reed, Jr., Yardley, PA (US)

(73) Assignees: Sarnoff Corporation, Princeton, NJ (US); Motorola Inc., Schaumburg, IL (US)

( * ) Notice: Subject to any disclaimer, the term of this patent is extended or adjusted under 35 U.S.C. 154(b) by 0 days.

(21) Appl. No.: 09/115,937

(22) Filed: Jul. 15, 1998

Related U.S. Application Data

(60) Provisional application No. 60/085,864, filed on May 18, 1998.

(51) Int. Cl.[7] ............................................. H04N 5/38
(52) U.S. Cl. ........................ 348/21; 348/607; 375/350
(58) Field of Search ......................... 348/21, 614, 607, 348/470, 725; 375/348, 350; H04N 5/38

(56) References Cited

U.S. PATENT DOCUMENTS

| | | | | |
|---|---|---|---|---|
| 5,745,187 A | * | 4/1998 | Hulyalkar et al. ............. 348/21 |
| 5,969,751 A | * | 10/1999 | Lee ............................. 348/21 |
| 6,052,158 A | * | 4/2000 | Nielsen ....................... 348/21 |
| 6,226,049 B1 | * | 5/2001 | Oh .............................. 348/21 |

* cited by examiner

Primary Examiner—Michael H. Lee
(74) Attorney, Agent, or Firm—William J. Burke

(57) ABSTRACT

A method and apparatus for detecting the presence of a co-channel interference signal and, in response to detecting such an interference signal, utilizing a co-channel interference rejection filter. Specifically, the present invention monitors the status information generated by the error detecting/correcting circuitry of a signal receiver such as a high definition television (HDTV) receiver. A counter is used to determine an error rate. While this first error rate is being determined, the filter is not used within the signal path of the receiver. The filter is then switched into the signal path of the receiver and a second error rate is determined. The first and second error rates are then compared and if the first error rate is the same or lower than the second error rate, the co-channel interference rejection filter is not utilized. Otherwise, the co-channel interference rejection filter is used in signal path of the receiver to remove an interference signal that is interfering with the proper demodulation of the received signal.

15 Claims, 2 Drawing Sheets

METHOD AND APPARATUS FOR DETECTING CO-CHANNEL INTERFERENCE AND SELECTIVELY FILTERING THE INTERFERENCE WHEN DETECTED

This patent application claims benefit of U.S. provisional patent application serial No. 60/085,864, filed May 18, 1998, the disclosure of which is incorporated herein reference.

The invention generally relates to high definition television signal receivers and, more particularly, to a method and apparatus for detecting co-channel interference within a vestigial sideband signal used to transmit high definition television information and selectively filtering the interference when detected.

BACKGROUND OF THE DISCLOSURE

High definition television (HDTV) receivers receive signals,. vestigial sideband (VSB) signals, from a portion of the radio frequency spectrum that is also occupied by conventional television signals. These conventional television signals are generally referred to as the National Television Standards Committee (NTSC) signals. To accurately demodulate a VSB signal, HDTV receivers require an NTSC signal rejection filter to be used in the demodulator of the receiver. The rejection filter is intended to suppress the NTSC signals such that reception and demodulation of the VSB signal is not affected by the presence of an NTSC signal. The use of an NTSC rejection filter is specified in the "Guide To The Use Of The ATSC Digital Television Standard" Document A/54, Advanced Television Systems Committee, Apr. 12, 1995 and incorporated herein by reference. However, it is well known in the art that the NTSC rejection filter suppresses the VSB signal by approximately 3 dB. To avoid the VSB signal suppression caused by the NTSC rejection filter, the ATSC standard recommends switching the NTSC rejection filter into the signal path of the HDTV receiver only when necessary, i.e., only when an NTSC signal is detected in the VSB channel.

The ATSC standard recommends using a pair of energy detectors, where one detector is located before the NTSC rejection filter and one detector is located after the NTSC rejection filter. These detectors measure the signal-to-interference plus noise ratio of the received signal. The signal energy is measured by each detector and compared such that the signal path with the largest signal-to-noise ratio (lowest interference energy) is selected, i.e., either the path with the NTSC rejection filter or no filter is selected.

When the NTSC signal level is near to the noise level of the received signal, the standard detection technique may erroneously decide to include (or not include) the NTSC rejection filter into the signal path. Whenever the NTSC rejection filter is incorrectly utilized, the VSB signal is not optimally processed by the HDTV receiver and errors result in the decoded VSB signal data.

Therefore, a need exists in the art for an HDTV receiver that accurately detects the presence of a co-channel interference signal by directly measuring the error rate of the HDTV receiver with and without the co-channel interference rejection filter and selectively utilizes the co-channel interference rejection filter depending upon the measured error rate.

SUMMARY OF THE INVENTION

The disadvantages heretofore associated with the prior art high definition television (HDTV) receivers are overcome by the present invention of a method and apparatus for detecting the presence of a co-channel interference signal (e.g., an NTSC signal) and, in response to detecting such an interference signal, utilizing a co-channel interference rejection filter. Specifically, the present invention monitors the status information generated by the error detecting/correcting circuitry of a signal receiver such as an HDTV receiver. A counter is used to determine an error rate. While this first error rate is being determined, the co-channel interference rejection filter is not used within the signal path of the receiver. The filter is then switched into the signal path of the receiver and a second error rate is determined. The first and second error rates are then compared and if the first error rate is the same or lower than the second error rate, the co-channel interference rejection filter is not utilized. Otherwise, the co-channel interference rejection filter is used in signal path of the receiver to remove an interference signal that is interfering with the proper demodulation of the received signal.

More specifically, in an HDTV receiver application, a counter is used to count the number of errors that have been detected/corrected by a Reed-Solomon decoder over a predefined period of time. While this first count is being accumulated, an NTSC rejection filter is not used within the signal path of the HDTV receiver, i.e., a mulitplexer switches the NTSC rejection filter out of the signal path. The first count (first error rate) is stored in memory. The NTSC rejection filter is then switched into the signal path such that the received signal is filtered by the NTSC rejection filter. The status information of the Reed-Solomon decoder is again monitored and a second error rate is accumulated. The first and second error rates are then compared and if the first error rate is the same or lower than the second error rate, then the NTSC rejection filter should not be utilized. If the second error rate is lower than the first error rate, then the NTSC rejection filter should be used by the receiver to remove an NTSC signal that is interfering with the proper demodulation of the received signal. In this manner, the NTSC rejection filter is selectively utilized such that the operation of the HDTV receiver is optimized. Additionally, at a time in the future when all NTSC broadcast stations no longer are transmitting NTSC signals, the HDTV receiver will optimally demodulate HDTV signals without interference by the NTSC rejection filter.

The present invention provides a number of advantages of the prior art. First, the present invention bases its decision to utilize the NTSC rejection filter or not upon the actual error rates of received signals. As such, when the NTSC signal level is near the noise level, the error rate should not be impacted and the present invention correctly decides whether to use the NTSC rejection filter. Another advantage of the present invention is its substantial cost savings. The prior art decision circuitry uses a complex measurement and computation technique requiring many costly multiply and divide operations that require a substantial amount of silicon area when the circuit is implemented in hardware. By relying upon the error indicator output of the Reed-Solomon decoder, the present invention uses a minimal amount of additional hardware to accomplish the error rate computation and comparison processes. As such, the silicon area needed to implement the invention and its power requirements are substantially less than that of the prior art circuitry.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
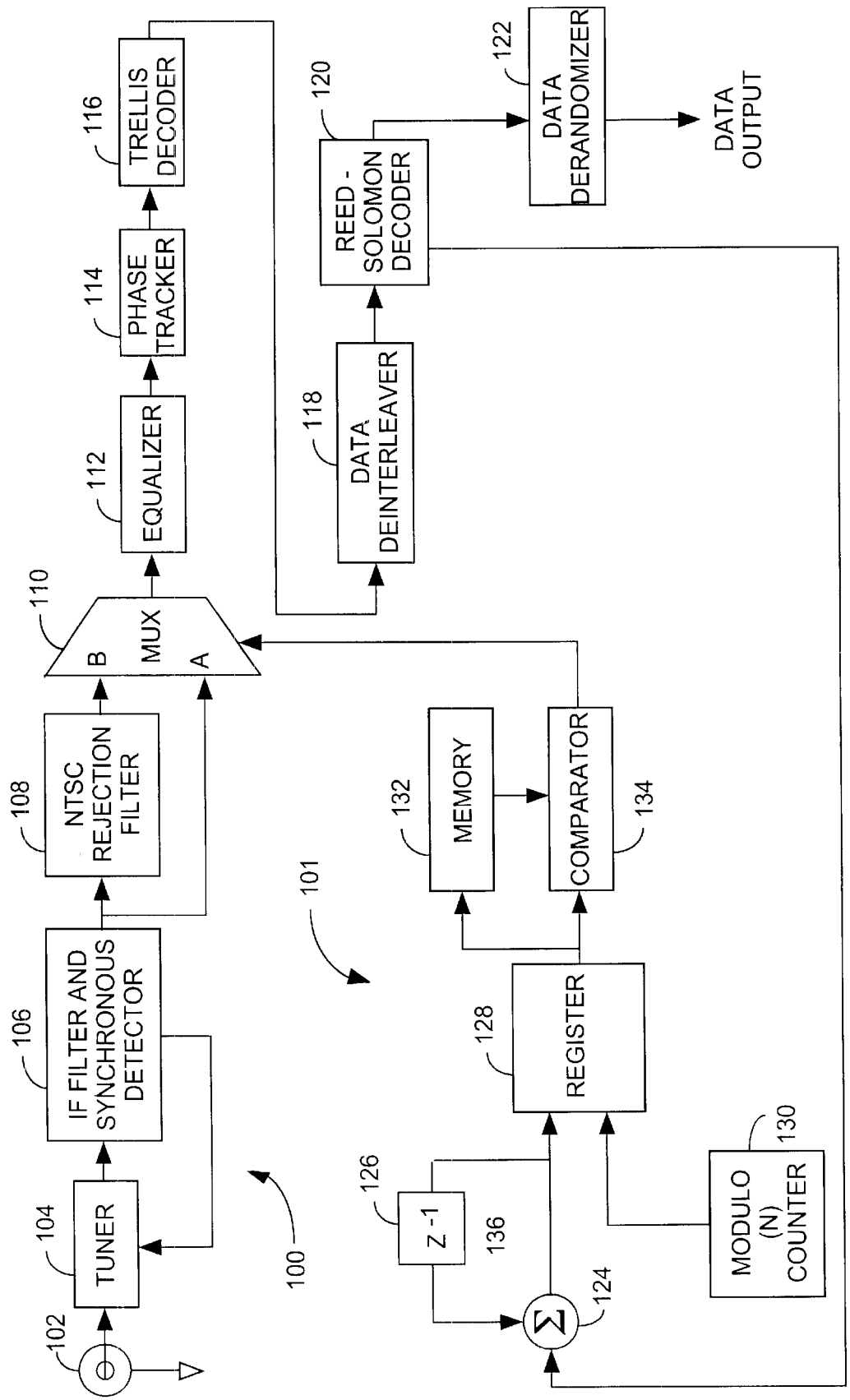
FIG. 1 depicts a block diagram of a co-channel interference detection circuit of the present invention.
Figure 2:
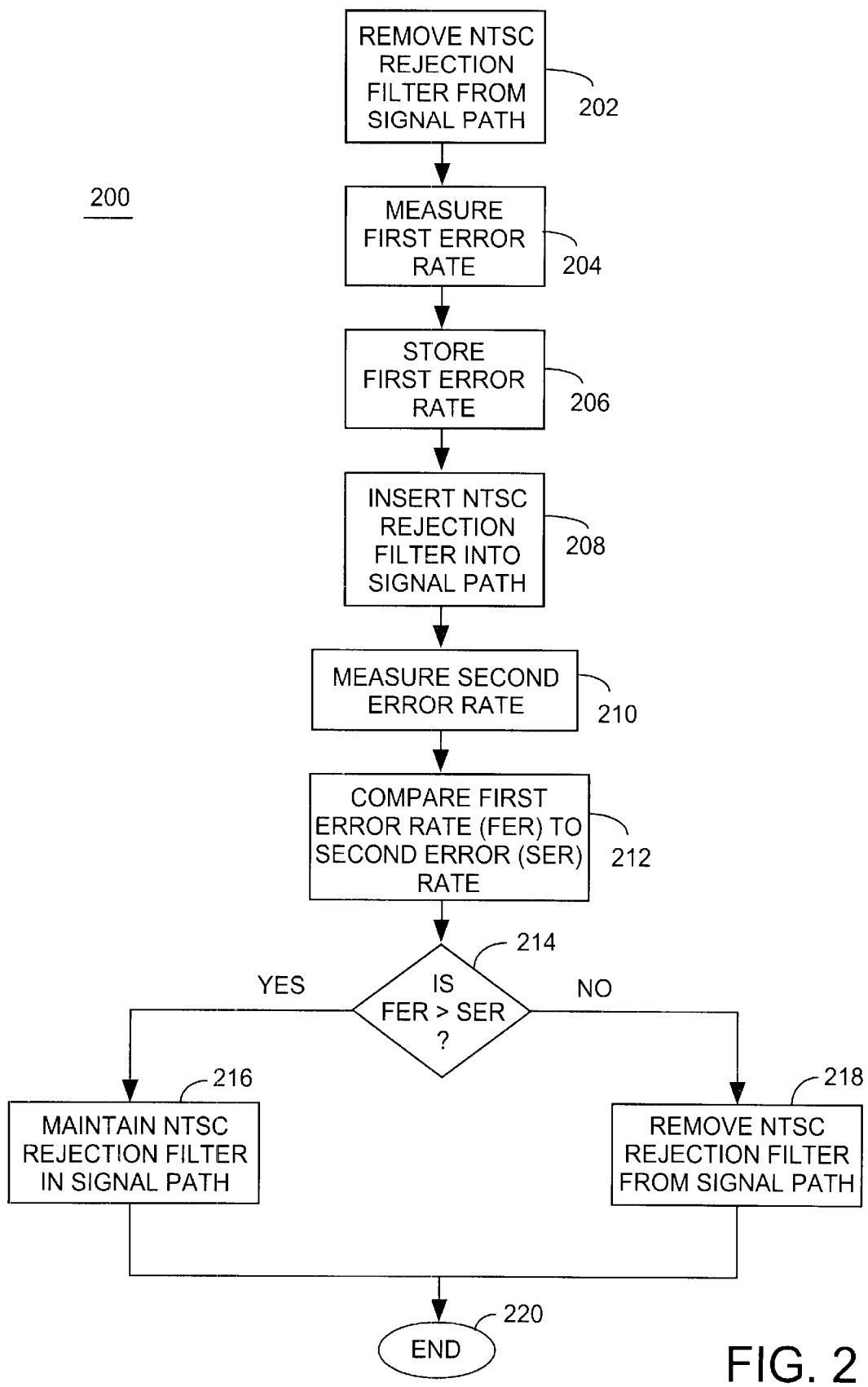
FIG. 2 depicts a flow diagram of the operation of the present invention.

FIG. 1 depicts a block diagram of a high definition television (HDTV receiver 100 for demodulating a vestigial sideband (VSB) signal containing a co-channel interference detector 101 of the present invention. FIG. 2 depicts a flow diagram representing the operation of the detector 101 of FIG. 1. To best understand the invention, the reader should simultaneously refer to FIGS. 1 and 2 while reading the following description of the invention The co-channel interference detector 101 of the present invention is incorporated into a substantially conventional HDTV receiver 100. The receiver 100 has as its input a band carrying a plurality of VSB signals that are compliant with the high definition television transmission standard. This band may also contain one or more co-channel interference signals such as NTSC television signals. One of the plurality of VSB signals is selected for demodulation by a conventional tuner 104. The output of the tuner 104 is generally a VSB signal at a passband IF frequency. The selected VSB signal is then preprocessed by an IF filter and synchronous detector 106 that performs carrier recovery of the pilot carrier within the VSB signal. The recovered pilot carrier is used by the tuner to downconvert the selected VSB signal to an IF frequency.

An NTSC rejection filter 108 is selectively inserted into the signal path using multiplexer 110. The NTSC rejection filter is a one tap linear feed-forward filter, a comb filter. The frequency response of the filter has a plurality of periodic nulls spaced (10.762 MHz/12), or 896.85 kHz apart. The nulls are arranged to suppress the NTSC visual carrier, the NTSC chrominance subcarrier and the NTSC aural carrier.

The output of the NTSC rejection filter is coupled to one input terminal of the multiplexer 110. Additionally, the input signal to the NTSC rejection filter is coupled to the multiplexer's second input terminal. The multiplexer 110 is controlled by the co-channel interference detection circuit 101 of the present invention such that either the NTSC rejection filtered signal, i.e., the filtered signal, or the unfiltered signal, is coupled through the multiplexer 110 to the remaining conventional circuits within the VSB signal receiver 100 that perform VSB signal demodulation.

The output signal of the multiplexer 110 is serially processed by an equalizer 112, a phase tracker 114, a trellis decoder 116, a data deinterleaver 118, a Reed-Solomon decoder 120 and a data derandomizer 122. The equalizer 112 adaptively equalizes the VSB signal to minimize intersymbol interference (ISI). The phase tracker 114 detects and tracks the phase error of the VSB signal to provide a stable data signal to the trellis decoder 116. The trellis decoder 116 and data interleaver 118 perform an inverse function to the coding and interleaving that was performed by the transmitter. Trellis coding and data interleaving is performed to allow the data transmission process to be robust in view of noise bursts and other signal interference.

The Reed-Solomon decoder 120 processes the trellis-decoded byte data. The Reed-Solomon decoder is a (207, 187)t=10 type, where the decoder uses 20 parity bytes to perform the byte error correction on a segment-by-segment basis. The decoder 120 corrects up to ten byte errors per data segment. The error corrected data is then derandomized in data derandomizer 122 to produce the data that was sent using the selected VSB signal.

Although a Reed-Solomon error correction circuit is common to a HDTV receiver, other forms of forward error correcting (FEC) circuit may function to error correct the data. A second output of the Reed-Solomon decoder 120 is a status port containing status information regarding the number of errors that are generated within a specific period of time by the Reed-Solomon error correction circuit. Generally this is a digital signal that will toggle for each error that is detected in the decoded signal. The co-channel interference detector 101 of the present invention uses this status information to determine when the NTSC rejection filter is needed.

The co-channel interference detector 101 contains a combiner 124, a delay 126, a register 128, a modulo N counter 130, a memory 132 and a comparator 134. A counter 136 counts the number of toggles (errors) that occur during a fixed period of time. The fixed period of time is set by the modulo N counter 130 which is coupled to the register 128. The counter 136 is formed by combiner 124, delay 126, and register 128. For each toggle of the decoder status that is coupled to the combiner 124, the counter 136 adds 1 to the previous count value in the register 128. As such, the combiner 124, the delay 126, and the register 128 accumulates a count value until the modulo N counter 130 times out and resets the register 128. As such, the modulo N counter 130 establishes a specific period of time during which the errors are counted, i.e., an error rate is produced.

When the modulo N counter 130 reaches the end of its predefined time period, the contents of the register 128 (a first error rate) is shifted into the memory 132 for temporary storage. During this period, the NTSC rejection filter 108 would not be in the circuit so that the multiplexer output is coupled to the unfiltered input port A. Once the modulo counter reaches the end of its period, the multiplexer 110 is switched such that the filtered input port B is coupled to its output and the Reed-Solomon error correction circuit now generates errors based on the filtered signal. In a similar manner as discussed, the counter 136 will accumulate a number counts in the register 128 over a predefined period of time set by the modulo N counter 130 and when the modulo N counter 130 reaches the end of its period, the error count (a second error rate) will be shifted to the input of the comparator 134 to compare the first error rate to the second error rate. Based on the relative values of the error rates measured with and without the NTSC filter in the signal path, the detector 101 decides whether the receiver should use the NTSC rejection filter 108.

FIG. 2 depicts a flow diagram of a process 200 by which the co-channel interference detector of the present invention operates. At step 202, the NTSC rejection filter is removed from the signal path and, at step 204, the first error rate is measured. At step 206, the first error rate is then temporarily stored in memory. At step 208, the NTSC rejection filter is inserted into the signal path and, at step 210, the second error rate is measured. At step 212, the first and second error rates are compared. The process queries, at step 214, whether the second error rate (SER) is lower than the first error rate (FER), If the query is positively answered, the NTSC rejection filter, at step 216, is used and the comparator switches the multiplexer such that the filtered input B of the multiplexer is coupled to the multiplexer output. On the other hand, if the query at step 214 is negatively answered (i.e., the filtered error count is the same or higher than the unfiltered error count), then, at step 218, the NTSC rejection filter is removed from the signal path such that the unfiltered input signal to the multiplexer is coupled to its output and the VSB receiver operates without the NTSC rejection filter being present in the demodulation circuitry. The process ends at step 220.

The co-channel interference detector of the present invention, as well as most components of the VSB receiver, may be implemented in hardware, software or a combination of both. As such, those skilled in the art will be able to program a general purpose computer or a specific purpose computer, such as an application specific integrated circuit (ASIC), to perform the functions of some or all of the blocks discussed above. As such, the invention may be embodied as a program stored on a digital storage medium whose program, when executed by a computer, causes the computer to perform the process steps of the present invention, i.e., the steps of FIG. 2.

Although various embodiments which incorporate the teachings of the present invention have been shown and described in detail herein, those skilled in the art can readily devise many other varied embodiments that still incorporate these teachings.

What is claimed is:

1. A co-channel interference detector comprising:
   counter circuit for determining a first error rate and a second error rate, where said first error rate is determined when a co-channel interference filter is not in a signal path and said second error rate is determined when a co-channel interference filter is in a signal path; and
   a comparator for comparing the first error rate to the second error rate to determine whether the co-channel interference filter is to subsequently be used or not in the signal path.

2. The co-channel interference detector of claim 1 wherein said co-channel interference filter is an NTSC rejection filter.

3. The co-channel interference detector of claim 1 wherein the counter circuit further comprises:
   a combiner have a first input that receives an error signal;
   a delay that couples the combiner output to a second input of the combiner;
   a register for accumulating a count of errors responsive to the error signal;
   a modulo N counter for establishing a time period over which the count of errors is accumulated.

4. The co-channel interference detector of claim 1 further comprising an error detecting circuit for producing an error signal indicative of the decoding errors produced when decoding a received signal, where the error signal is used by the counter circuit to determine the first and second error rates.

5. The apparatus of claim 4 wherein said error detecting circuit is an forward error correcting circuit.

6. The apparatus of claim 5 wherein said error detecting circuit is a Reed-Solomon decoder.

7. An high definition television for receiving and decoding a vestigial sideband (VSB) comprising:
   a tuner for selecting a VSB signal from a plurality of VSB signals;
   a co-channel interference rejection filter for suppressing a co-channel interference signal within a channel with the selected VSB signal;
   a multiplexer for selectively inserting or removing the co-channel interference filter from a signal path for the selected VSB signal;
   signal processing circuits for equalizing and decoding the selected VSB signal;
   a error detecting circuit for identifying decoding errors produced by the signal processing circuits while decoding the selected VSB signal;
   an error counting circuit for counting the number of errors detected by said error detecting circuit to determine a first error rate and a second error rate, where said first error rate is determined when a co-channel interference filter is not in the signal path and said second error rate is determined when a co-channel interference filter is in the signal path; and
   a comparator for comparing the first error rate to the second error rate to determine whether the co-channel interference filter is to subsequently be used or not in the signal path, where the comparator controls the multiplexer.

8. The high definition television of claim 7 wherein said co-channel interference filter is an NTSC rejection filter.

9. The high definition television of claim 7 wherein the counter circuit further comprises:
   a combiner have a first input that receives an error signal;
   a delay that couples the combiner output to a second input of the combiner; a register for accumulating a count of errors responsive to the error signal;
   a modulo N counter for establishing a time period over which the count of errors is accumulated.

10. The high definition television of claim 7 wherein said error detecting circuit is a forward error correcting circuit.

11. The high definition television of claim 7 wherein said error detecting circuit is a Reed-Solomon decoder.

12. A method for determining whether a co-channel interference filter should be used in a signal receiver comprising the steps of:
    measuring a first error rate without the co-channel interference filter in a signal path of the signal receiver;
    measuring a second error rate with the co-channel interference filter in the signal path of the signal receiver;
    comparing the first error rate to the second error rate; and
    if the first error rate is greater than the second error rate, placing the co-channel interference filter in the signal path of the signal receiver, otherwise, not using the co-channel interference filter.

13. The method of claim 12 wherein the error rate is determined by counting errors detected by an error detection circuit over a predefined period of time.

14. The method of claim 7 wherein the error rate is determined by counting errors detected by a Reed-Solomon decoder over a predefined period of time.

15. A digital storage medium containing a program that, when executed by a computer, causes the computer to perform a method comprising the steps of:
    measuring a first error rate without a co-channel interference filter in a signal path of a signal receiver;
    measuring a second error rate with the co-channel interference filter in the signal path of the signal receiver;
    comparing the first error rate to the second error rate; and
    if the first error rate is greater than the second error rate, placing the co-channel interference filter in the signal path of the signal receiver, otherwise, not using the co-channel interference filter.

* * * * *